Patented July 25, 1944

2,354,565

UNITED STATES PATENT OFFICE 2,354,565

ISOMERIZATION OF NORMAL PARAFFINS

John E. Wood, III, Baton Rouge, La., and Charles S. Lynch, Plainfield, N. J., assignors to Standard Oil Development Company, a corporation of Delaware No Drawing. Application September 6, 1941, Serial No. 409,834

10 Claims. (Cl. 260—683.5)

The present invention relates to a novel isomerization catalyst and the process of using the same in the isomerization of normal paraffinic hydrocarbons to produce their branched chain or isoparaffinic hydrocarbons.

Numerous processes have been proposed for converting paraffins into isoparaffins. In general these processes utilized at least one Friedel-Crafts type catalyst, such as, for example, aluminum chloride, aluminum bromide, iron chloride, zinc chloride and the like. In these processes where the Friedel-Crafts type catalysts are employed usually there is added to the reaction a promoter for the catalyst, such as for example water, hydrogen chloride, hydrogen bromide, chlorine, bromine, or other free halogens and hydrogen halides, such compounds as the alkyl halides, for example methyl, ethyl, propyl, butyl, amyl chlorides and bromides, carbon tetrachloride, chloroform and the like. A further improvement in the process has been in the discovery that elemental or free hydrogen when added to the process materially reduces the tendency toward degradation and cracking of the feed stocks and thereby materially improves the yield of the desired products. Aside from the Friedel-Crafts type catalyst, however, no good catalyst for promoting the isomerization of normal paraffins to isoparaffins has been found.

It has now been discovered, however, that the isomerization of normal or straight chain paraffins having at least 4 carbon atoms per molecule into their corresponding branched chain isomers or isoparaffins having at least 4 carbon atoms per molecule may be efficiently carried out by employing a novel isomerization catalyst. It has been discovered that mixtures of hydrogen fluoride and sulfur trioxide wherein the hydrogen fluoride is present in a greater quantity than equal molar amounts with respect to the sulfur trioxide provide a catalyst which activates the isomerization of normal paraffins to isoparaffins in a hitherto unexpected manner. The catalyst may likewise be enhanced in its catalytic activity by the addition of boron trifluoride or other boron halides, such as, for example, boron trichloride and as has been found to be the case in connection with the usual aluminum halide isomerization catalyst, the process may, if desired, also be operated in the presence of a superatmospheric pressure of free or elemental hydrogen either with or without the presence of a boron trihalide. Further modification of the catalytic composition to produce the hitherto unexpected results may be attained by the use of sulfur trioxide with boron trifluoride alone or sulfur trioxide with boron trifluoride and hydrogen alone. These last two catalyst compositions are at least initially free of hydrogen fluoride. Although the exact chemical compositions of these mixtures when placed in an isomerization reaction vessel are not definitely known, it is quite possible that various complexes may be formed as between the various constituents of the catalyst compositions, for example, it is known that fluorsulfonic acid may be formed when equal molar quantities of $SO_3$ and hydrogen fluoride unite. Regardless of the actual mechanism and theories of the catalyst formation and its exact chemical composition the invention may be practiced by employing the following compositions for effecting the isomerization of normal paraffins to isoparaffins.

$HF+SO_3$
$HF+SO_3+H_2$
$HF+SO_3+BF_3+H_2$
$SO_3+BF_3$
$SO_3+BF_3+H_2$

In those instances where both HF and $SO_3$ are employed, it is important in practicing the teachings of the present invention wherein the novel catalyst composition is employed to add more than equal mols of HF per mol of $SO_3$. In making up the catalyst composition, however, it may be desirable to employ fluorsulfonic acid as part of the catalyst composition supplementing the same by an additional quantity of HF. At any event, it is preferred to maintain a molar ratio of HF to $SO_3$ of between about 1.5 to 1 and about 2.5 to 1. However the molar ratio of HF to $SO_3$ may be maintained at any point above 1:1 up to and including about 4:1.

When introducing the catalytic components into the reaction, it is preferred that the reaction zone be maintained at the temperature of the reaction and that the amount of the gases introduced be measured according to the increase in the pressure of the autoclave or other reaction chamber employed. On the other hand, if it is desired to create an autogenous pressure, it may be preferred to cool the autoclave containing fresh feed and while at this low temperature introduce in a precooled condition the catalytic components. It then becomes a practical procedure to simply raise the temperature of the autoclave to the isomerization temperature and to vigorously agitate the reaction mixture and the pressure developed will be sufficient to accomplish the desired results.

One of the objects of the invention is to accomplish an isomerization of normal paraffins to isoparaffins by use of these novel catalysts with the attendant advantage that the reaction proceeds with improved selectivity at high conversion levels. By selectivity is meant the percentage of normal paraffins being reacted which go to isoparaffin of the same molecular weight. In other words a selectivity of 100% would indicate that all of the normal paraffin reacted went to form the corresponding isoparaffin with no by-products produced in the reaction. One of the attributes of the novel catalyst compositions is that a better selectivity for any given conversion level is obtainable than has heretofore been obtainable using the customary Friedel-Crafts type catalyst.

The quantity of the respective constituents of the catalyst mass may vary considerably. Thus, for example in the use of HF and $SO_3$ the total amount of catalyst may vary between about 5 and about 120% by volume based on the hydrocarbon present in the reaction zone at any one time, preferably between about 15 and about 75% by volume with the molar ratios as between the HF and $SO_3$ as heretofore specified. Where $BF_3$, HF and $SO_3$ are all present in the catalyst composition, the amount of catalyst may vary between about 10 and about 150% by volume based on the hydrocarbon present in the reaction zone at any one time, preferably between about 25% and about 100%. Likewise where boron trifluoride and sulfur trioxide are present the amount of catalyst may vary between about 10% and about 200% by weight, based on the hydrocarbon, preferably between about 20% and about 125% by weight.

The process of the present invention is useful for the isomerization of a large variety of feed stocks. Thus, for example, normal butane, normal pentane, normal hexane, normal heptane, normal octane and the higher straight chain paraffinic homologues either individually or in admixture with one another may be employed as feed stocks in the present process. Likewise, field butanes, straight run naphthas, particularly those of predominantly paraffinic nature, and also simple branched chain paraffins which may be isomerized to more highly branched chain paraffins, may be employed. In general, any normal paraffin containing at least four carbon atoms per molecule or any mixture of paraffins predominantly composed of normal paraffins containing at least four carbon atoms per molecule may be employed as satisfactory feed stocks for the present process. Where the feed stock employed is composed of normal paraffins containing at least 6 carbon atoms per molecule or where the feed stock contains substantial amounts of such paraffins, there is a distinct tendency when subjected to the process of the present invention to form in the final product substantial amounts of cracked products of higher and lower molecular weight than the corresponding reactants. In particular, it is noted that these lighter products predominate in branched chain paraffins. Thus, when n-hexane is the feed stock, large quantities of isobutane, isopentane and branched chain hexanes, as well as the branched chain heptanes, are produced. From the standpoint of efficiency of operation, it is desirable to minimize the presence of olefins and aromatics in the feed stock, although traces of these substances may be present in the feed stock without disrupting to any great extent the catalytic activity and the completion of the desired isomerization process.

A temperature range between about 40° F. and about 350° F. is generally employed. It is preferred, however, with the usual type of feed stocks, particularly those of the higher paraffinic series, to employ a temperature between about 75° F. and about 200° F. Within any of the particular temperature ranges, however, it is necessary to correlate not only the temperature with the character of the straight chain paraffin being isomerized but also this reaction condition and the reactants with the time of contact of the hydrocarbons with the catalyst mass, the amount of catalyst and with the pressure under which the reaction is maintained. In general, contact times between about one-half hour and about 20 hours are employed. The actual length of residence of the feed in the reaction chamber in contact with the catalyst is, as above stated, correlated with the temperature employed, the catalyst concentration and the nature of the feed entering the reactor. Generally, the preferred time of contact lies between about 1 hour and about 10 hours. It is believed that in general those skilled in the art are capable of working up the actual details of operation, particularly in view of the correlations hereinafter described in the examples. The amount of boron trihalide introduced into the reactor if it is used may amount to that quantity indicated by an increase in pressure up to about 500 lbs. per square inch when the temperature of the reactor is maintained at between about 40° F. and about 350° F. It is in general, however, preferred to operate at a boron trihalide pressure of between about 0 and about 200 lbs. per square inch. Obviously, at the higher pressures and lower reaction temperatures larger amounts of boron trihalides will be dissolved. In cases where no positive pressure of boron trihalide is employed, the reaction may be carried out with only sufficient boron trihalide to substantially completely dissolve in the hydrocarbon and/or catalyst compositions or no promoter may be added whatsoever. If a desired final total pressure is above that of the autogenous pressure of the reactants, catalysts, and catalyst promoter at the reaction temperature or if the pressure is below that sufficient to maintain liquid phase operations under the reaction conditions, then extraneous pressure may be applied by the use of some gas such as nitrogen, sulfur dioxide, carbon dioxide or hydrogen.

When used, the amount of elemental hydrogen introduced may vary over a fairly wide range. However, under the specified reaction temperatures hydrogen may be pressed into the reactor to the extent of increasing the pressure therein from between about 50 and about 500 lbs. per square inch, preferably between about 100 and about 300 lbs. per square inch, under the other reaction conditions obtained. If a desired final total pressure of about 1500 lbs. per square inch is to be maintained and the temperature and the vapor pressure of the reactants at that temperature, together with the total boron trihalide pressure, do not attain that desired pressure, then further hydrogen pressure may be advantageously applied to attain this desired 1500 lbs. per square inch pressure. In general, where the reaction is carried out at the higher temperatures and under the other more drastic reaction conditions, and particularly where the feed stock has a considerable tendency to crack under these reaction conditions, the introduction of these larger amounts of hydrogen has been found to be advantageous in suppressing the tendency of the feed stock to crack. It is then possible to direct the reaction predominantly toward an isomerizing process.

It has been found desirable to maintain the reaction in the liquid phase and to vigorously agitate the reaction mixture to secure adequate contact of the catalyst composition with the feed stock although vapor phase operation is contemplated. The production of high yields of isoparaffins from normal paraffins appears to be favored by an intensive agitation of a liquid phase reaction mixture. Any suitable type of agitating device may be employed, such as for example a turbomixer, jets of restricted internal diameter, etc.

The unreacted reactants, catalyst promoter, and heavier and lighter products of the reaction which may be separated from the desired isomeric product and from each other may be returned, either in whole or in part as desired, to the isomerization zone. The desired isomeric products of the reaction may be separated as a hydrocarbon layer from the acid layer in a settler. The hydrocarbon layer may then be neutralized with a suitable alkali, for example, caustic soda, and distilled to separate the above-mentioned products. The desired final products find many uses among which may be mentioned as one of the reactants in aliphatic alkylation reactions, as blending agents in the preparation of aviation gasolines, as feed stocks for catalytic dehydrogenation units, etc. The acid catalyst layer separated from the hydrocarbon layer may be returned to the isomerization reaction.

A continuous as well as a batch type of operation may be carried out in practicing the present invention. In general, for obvious commercial reasons the continuous process is preferred. No special type of apparatus need be employed except that care should be taken to avoid excessive corrosion by the catalyst compositions. The types of apparatus now customarily employed for carrying out polymerization of olefins in the liquid phase, the aliphatic alkylation of isoparaffins with olefins in the liquid phase, and similar types of equipment may be employed. It has been shown that a circulating stream type of process in which only a small portion of that stream is removed from the sphere or zone of reaction at any one time has advantages over some of the other types of equipment. Such a process may be employed in practicing the present invention. A series of reactors, each equipped as described, may be used either in parallel or in series. In a series arrangement various stages of the reaction may be carried out in each reactor under conditions best suited for that particular stage, that is, as to rates of throughput, times of contact, temperatures, amount of catalyst, etc.

As illustrative of the character of the invention and in order to more completely understand the same, the following examples are herewith presented although it is not intended that the invention be construed or limited thereto.

EXAMPLE 1

In a 500 cc. autoclave there was placed 175 grams of sulfur trioxide under 200 lbs. per square inch pressure of $BF_3$ for about 65 hours and then 155 grams of normal pentane were added and the $BF_3$ pressure readjusted to 200 lbs. per square inch, after which the autoclave was agitated at 75° F. for a period of 22 hours at the end of which time 17% of the normal pentane had reacted giving a yield of 16% isopentane based on the amount of normal pentane originally added to the reaction mixture. This amounted to a selectivity of about 94%.

EXAMPLE 2

A four liter turbo mixer had charged thereto about 200 grams of normal pentane and about 615 grams of fluorsulfonic acid of which 492 grams was $SO_3$ and 123 grams was HF but wherein the HF to $SO_3$ mol ratio was about 1:1. To this mixture maintained at a temperature of about 90° F. there was added about 100 lbs. per square inch of $BF_3$ and about 500 lbs. per square inch additional of molecular hydrogen. The mixture was vigorously agitated for a period of about two hours at the end of which time 59% of the original normal pentane had reacted, but only about 30% of isopentane on the same basis was formed. This gave a selectivity of only about 51%.

EXAMPLE 3

Under substantially identical conditions except that no molecular hydrogen was employed the temperature was 80° F. and the time of reaction was three hours, only 16% of the normal pentane reacted and only 7% of isopentane was formed giving a selectivity of only about 44%.

EXAMPLE 4

In contrast to the two preceding examples and for comparative purposes a run was made using a molar ratio of two mols of HF per mol of $SO_3$ and the charge of normal pentane was 205 grams with 480 grams of $SO_3$ and 240 grams of HF being employed which amounted to 120 grams of HF over and above that going to form $FSO_3H$. To this reaction mixture there was pressed in 100 lbs. per square inch of $BF_3$ and an additional 200 lbs. per square inch of molecular hydrogen at 120° F. The reaction mixture was vigorously agitated for about 4 hours at the end of which time about 57% of the normal pentane had reacted giving a yield of 54% isopentane. This amounted to a selectivity of about 95%.

EXAMPLE 5

A similar experiment was run identical in all respects to that employed in Example 4 except that the reaction was allowed to run for five hours instead of four. The reacted mixture showed that 63% of the normal pentane had reacted and that 61% of isopentane had been formed giving a selectivity of about 97%.

EXAMPLE 6

Under substantially identical conditions as stated in Example 5 with respect to employing a 2:1 molar ratio HF to $SO_3$ and using a four liter turbo mixer, 205 grams of normal pentane together with 480 grams of $SO_3$ and 240 grams of HF, 120 of the grams of HF being in excess of that stoichiometrically required to form $FSO_3H$, were agitated at 90° F. for a period of about two hours at about 100 lbs. per square inch pressure of boron trifluoride. The product showed that 70% of the normal pentane had reacted, of which 86% went to form isopentane.

EXAMPLE 7

In an other run carried out in the same reactor as that described in Example 6, 480 grams of SO₃ plus 180 grams of HF (60 grams of HF being in excess of an equal molar ratio with the SO₃) together with 205 grams of normal pentane, were agitated for a period of about 1 hour at a temperature of 90° F. and in the presence of 100 lbs. per square inch of boron trifluoride. The product obtained showed that 62% of the normal pentane had reacted of which 85% was isopentane.

EXAMPLE 8

In order to show that the use of increased amounts of HF over and above the stoichiometrical ratio with SO₃ improves selectivities at high conversion levels although the isomerization reaction rate is reduced, the following series of runs were made under comparable conditions with the following results.

Table 1

| Run | Temp., °F. | Volume per cent SO₃-HF | Mol ratio HF/SO₃ | Press., #/sq. in. BF₃ | Press., #/sq. in. H₂ | Time, hours | Per cent n-pentane reacted | Per cent n-pentane reacted going to i-pentane |
|---|---|---|---|---|---|---|---|---|
| 1 | 110 | 100 | 1/1 | 100 | 200 | 2 | 44 | 77 |
| 2 | 110 | 100 | 1/1 | 100 | 200 | 3 | 61 | 77 |
| 3 | 90  | 100 | 1/1 | 100 | 500 | 2 | 59 | 51 |
| 4 | 125 | 120 | 2/1 | 100 | 200 | 4 | 57 | 95 |
| 5 | 125 | 120 | 2/1 | 100 | 200 | 5 | 63 | 97 |

Having now thus fully described and illustrated the nature of the invention, what is claimed as new and useful and desired to be secured by Letters Patent is:

1. A process which comprises reacting at least one normal paraffin containing at least 4 carbon atoms per molecule under isomerization reaction conditions in the presence of a catalyst selected from the group consisting of admixtures of SO₃ with HF in molar excess of the SO₃, SO₃ with BF₃, and SO₃ with BF₃ and with HF in molar excess of the SO₃.

2. A process as in claim 1 wherein the reaction is carried out in the presence of molecular hydrogen.

3. A process as in claim 1 wherein the process is carried out at least under sufficient superatmospheric pressure to maintain liquid phase operation under the reaction conditions obtaining.

4. A process as in claim 1 wherein the isomerization reaction is carried out in the presence of a catalyst composition which is an admixture of HF, SO₃ and BF₃ and in the presence of free hydrogen and wherein the HF to SO₃ molar ratio is in excess of 1:1 but below about 4:1.

5. A process which comprises isomerizing at least one normal paraffin containing at least 4 carbon atoms per molecule under isomerization reaction conditions in the presence of a catalyst composition which is an admixture of SO₃ and BF₃.

6. A process as in claim 5 wherein normal pentane is the feed stock employed and wherein a temperature of between about 60 and about 150° F. is maintained in the isomerization reaction zone.

7. A process which comprises isomerizing normal pentane to isopentane while maintaining a temperature between about 60 and about 150° F. for a period of between about ½ and about 20 hours in the presence of between about 1.5 and about 2.5 mols of HF per mol of SO₃ while pressing in between about 50 pounds per square inch and about 200 pounds per square inch of boron trifluoride.

8. Process as in claim 7 wherein between about 50 lbs. per square inch and about 500 lbs. per square inch of elemental hydrogen are maintained in the reaction zone during the reaction.

9. A process as in claim 7 wherein normal butane replaces the normal pentane as the feed stock.

10. A process which comprises isomerizing about 155 grams of normal pentane at a temperature of about 90° F. for a period of time of about 20 hours in the presence of about 90 grams of SO₃, about 35 lbs. per square inch pressure of boron trifluoride and about 125 lbs. per square inch pressure of free hydrogen.

JOHN E. WOOD, III.
CHARLES S. LYNCH.